United States Patent
Delos Ayllon et al.

(10) Patent No.: US 9,806,604 B2
(45) Date of Patent: Oct. 31, 2017

(54) COMPACT POWER CONVERSION DEVICE WITH CONTINUOUS OUTPUT REGULATION RANGE

(71) Applicant: KONINKLIJKE PHILIPS N.V., Eindhoven (NL)

(72) Inventors: Julia Delos Ayllon, Eindhoven (NL); Toni Lopez, Eindhoven (NL); Machiel Antonius Martinus Hendrix, Eindhoven (NL); Eduardo-Jose Alarcon-Cot, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/907,873

(22) PCT Filed: Sep. 3, 2014

(86) PCT No.: PCT/IB2014/064214
§ 371 (c)(1),
(2) Date: Jan. 27, 2016

(87) PCT Pub. No.: WO2015/040517
PCT Pub. Date: Mar. 26, 2015

(65) Prior Publication Data
US 2016/0190917 A1    Jun. 30, 2016

(30) Foreign Application Priority Data
Sep. 19, 2013   (EP) ...................................... 13185189

(51) Int. Cl.
*H05B 33/08*   (2006.01)
*H02M 3/04*    (2006.01)
(Continued)

(52) U.S. Cl.
CPC ............. *H02M 3/04* (2013.01); *H02M 3/158* (2013.01); *H05B 33/0815* (2013.01); *H02M 2001/0074* (2013.01); *H02M 2003/072* (2013.01)

(58) Field of Classification Search
USPC ... 315/88, 89, 90, 93, 127, 121, 128, 185 R, 315/192, 193, 291, 294, 295, 297, 299,
(Continued)

(56) References Cited

U.S. PATENT DOCUMENTS

| 7,696,735 B2 | 4/2010 | Oraw et al. |
| 2006/0262574 A1 | 11/2006 | Kelly |

(Continued)

FOREIGN PATENT DOCUMENTS

| JP | 2011050209 A | 3/2011 |
| JP | 2011217458 A | 10/2011 |

OTHER PUBLICATIONS

Kumar et al Novel Switched Capacitor Based Triple Output Fixed Ratio Converter (TOFRC), Applied Power Electronics Conference and Exposition (APEC) 2012 Twenty-Seventh Annual IEEE, p. 2352-2356.

*Primary Examiner* — Douglas W Owens
*Assistant Examiner* — Jianzi Chen
(74) *Attorney, Agent, or Firm* — Akarsh P. Belagodu (57) ABSTRACT

The current invention relates to a power conversion device (10), for supplying a load (11) with a PWM signal through an inductive output filter (105). The power conversion device (10) comprises a power conversion module (101) supplied by a DC input voltage (Vin) and is configured for providing a plurality of output signals (PWM1, ..., PWMn) having a level amplitude that is a fraction of the input voltage (Vin) level. Each output signal is floating with a bias component equally split in a plurality of steps ranging from
(Continued)

a determined lowest fraction level amplitude to a determined highest fraction level amplitude. The power conversion device (10) further comprises a multiplexer (103) receiving as a plurality of inputs the plurality of output signals (PWM1, ..., PWMn). The multiplexer is configured for outputting one output signal (PWMx) selected from the plurality of inputs, whereby the output signal (PWMx) of the multiplexer (103) is connected to the output filter (105).

15 Claims, 6 Drawing Sheets (51) Int. Cl.
*H02M 3/158* (2006.01)
*H02M 1/00* (2006.01)
*H02M 3/07* (2006.01)

(58) Field of Classification Search
USPC ....... 315/301, 307, 308, 312, 313, 314, 315, 315/320, 361, 362
See application file for complete search history.

(56) References Cited

U.S. PATENT DOCUMENTS

| 2009/0322384 | A1 | 12/2009 | Oraw et al. | |
|---|---|---|---|---|
| 2010/0156368 | A1 | 6/2010 | Huynh et al. | |
| 2013/0229841 | A1* | 9/2013 | Giuliano | H02M 3/07 363/60 |
| 2014/0300413 | A1* | 10/2014 | Hoyerby | H02M 1/08 330/251 |

* cited by examiner

COMPACT POWER CONVERSION DEVICE WITH CONTINUOUS OUTPUT REGULATION RANGE

CROSS-REFERENCE TO PRIOR APPLICATIONS

This application is the U.S. National Phase application under 35 U.S.C. §371 of International Application No. PCT/IB2014/064214, filed on Sep. 3, 2014, which claims the benefit of European Patent Application No. 13185189.1 filed on Sep. 19, 2013. These applications are hereby incorporated by reference herein.

TECHNICAL FIELD

The current invention relates to the field of integrated power converters. The current invention can notably apply to drive circuits for Light Emitting Diode (LED) light sources. More specifically, the current invention relates to a compact and efficient power conversion device.

BACKGROUND

Applications requiring a high level of integration of power conversion modules, for example using Switched Mode Power Supplies (SMPS), can resort to power converters such as Switched Capacitor Converters (SCC), which can provide highly efficient DC-to-DC voltage conversion with only the use of capacitors and switches, combined with inductive output filters.

Notably, the Solid State Lighting (SSL) Industry's demand for small and compact power management units for LEDs is increasing. LEDs require that a power supply be delivered in the form of a constant current, as efficiently as possible. Ideally, LED drivers comparable in size to the LEDs themselves would represent a significant breakthrough enabling new lighting concepts. Such a solution will require a system with a high level of reliability and efficiency, in order to fit the requirements of life-time, size and heat dissipation.

LED drivers can be based on SMPS. SMPS can comprise SCCs, which allow a high level of integration and achieve large power conversion ratios, but have the drawback of providing plural discrete conversion ratios, which do not make SCCs suitable for applications where a fine regulation of the output power is required.

SMPS can also comprise conventional Inductive Converters, comprising a plurality of inductors and switches. Inductive Converters allow a fine regulation of the output power and can efficiently provide an arbitrary conversion ratio, but one drawback of Inductive Converters is that they cannot be easily integrated in compact structures.

SUMMARY

One aim of the present invention is to remedy the above-mentioned shortcomings of the prior art, by proposing a solution allowing realizing high-efficient, low-volume hybrid power converters, particularly adapted to be used in integrated drivers for LEDs. The current invention further allows realizing a power management unit for an LED that can be easily integrated within a compact package. The current invention may further allow integrating a LED and associated power management unit in a same submount or substrate.

According to the present invention, it is proposed that the filter requirements of the SMPS be dramatically reduced, so that far less bulky inductors can be used, while preserving high conversion efficiency, for a wide and continuous output regulation range.

For that purpose, the current invention proposes a novel power conversion device, for supplying a load with a Pulse Width Modulation (PWM) signal, comprising an inductive output filter having at least an output configured to be connected to the load, the power conversion device comprising:
  a power conversion module supplied by a DC input voltage and configured for providing a plurality of output signals having a level amplitude that is a fraction of the input voltage level, each output signal being floating with a bias component split in a plurality of steps ranging from a determined lowest fraction level amplitude to a determined highest fraction level amplitude;
  a selection module adapted to select one output signal among said plurality of output signals, the selected output signal being connected to the output filter.

In an exemplary embodiment of the invention, the selection module can comprise a multiplexer receiving as a plurality of inputs said plurality of output signals and configured for outputting one output signal selected from said plurality of inputs.

In another exemplary embodiment of the invention, the selection module comprises a wiring of the selected output signal to the output filter.

In an exemplary embodiment of the invention, the power conversion device can further comprise a controller configured for controlling a duty cycle and/or a frequency of the output signals of the power conversion module as a function of at least one component among the group consisting of input signals representative of a sensed supply voltage, a sensed output voltage of the power conversion module, and a signal representative of a sensed load voltage, load current or load power.

In an exemplary embodiment of the invention, the power conversion module can comprise a Switched Capacitor Converter (SCC), comprising a plurality of switches controlled by the controller.

In an exemplary embodiment of the invention, the power conversion module can be based on a Dickson ladder topology.

In an exemplary embodiment, the plurality of output signals can be formed by voltages at respective internal nodes of the power conversion module.

Another aspect of the invention is a driver for a Light Emitting Diode (LED) comprising a power conversion device as in any of the described embodiments.

Another aspect of the invention is a LED package comprising at least one LED and an associated driver as per any of the described embodiments.

According to an exemplary embodiment of the invention, such LED package can be integrated as a Power System on a Chip (PSoC) or Power System in a Package (PSiP).

Another aspect of the invention is a method for supplying a load with a PWM signal through an inductive output filter having at least an output configured to be connected to the load, comprising at least a step of converting the power supplied by a DC input voltage into a plurality of output signals having a level amplitude that is a fraction of the input voltage level, each output signal being floating with a bias component split in a plurality of steps ranging from a determined lowest fraction level amplitude to a determined highest fraction level amplitude, and selecting by means of a multiplexer connected to the output filter, one output signal selected from said plurality of output signals.

Another advantage of the current invention in some of its embodiments is that it allows reducing the electromagnetic emissions, therefore improving ElectroMagnetic Interference (EMI).

Yet another advantage of the current invention is that voltage stresses in the switches comprised by the power conversion device can be dramatically reduced, therefore notably improving life-time of the power conversion device as well as enabling high efficient conversion. Furthermore, reducing the voltage stresses allows using smaller switches, which results in cheaper integration processes, complying with Very Large Scale Integration (VLSI) requirements, which results in possibly faster switching speeds.

Yet another advantage of the current invention in some of its embodiments is that, in comparison with existing power conversion devices having similar performances, the number of capacitors used in the power conversion device can be significantly reduced.

BRIEF DESCRIPTION OF THE DRAWINGS

These and other characteristics and advantages of the invention will be made clearer in view of the detailed description given below of a preferred embodiment, provided by way of an illustrative and non-limiting example only, as well as the accompanying drawings which represent.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present disclosure that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present disclosure.

Figure 1:
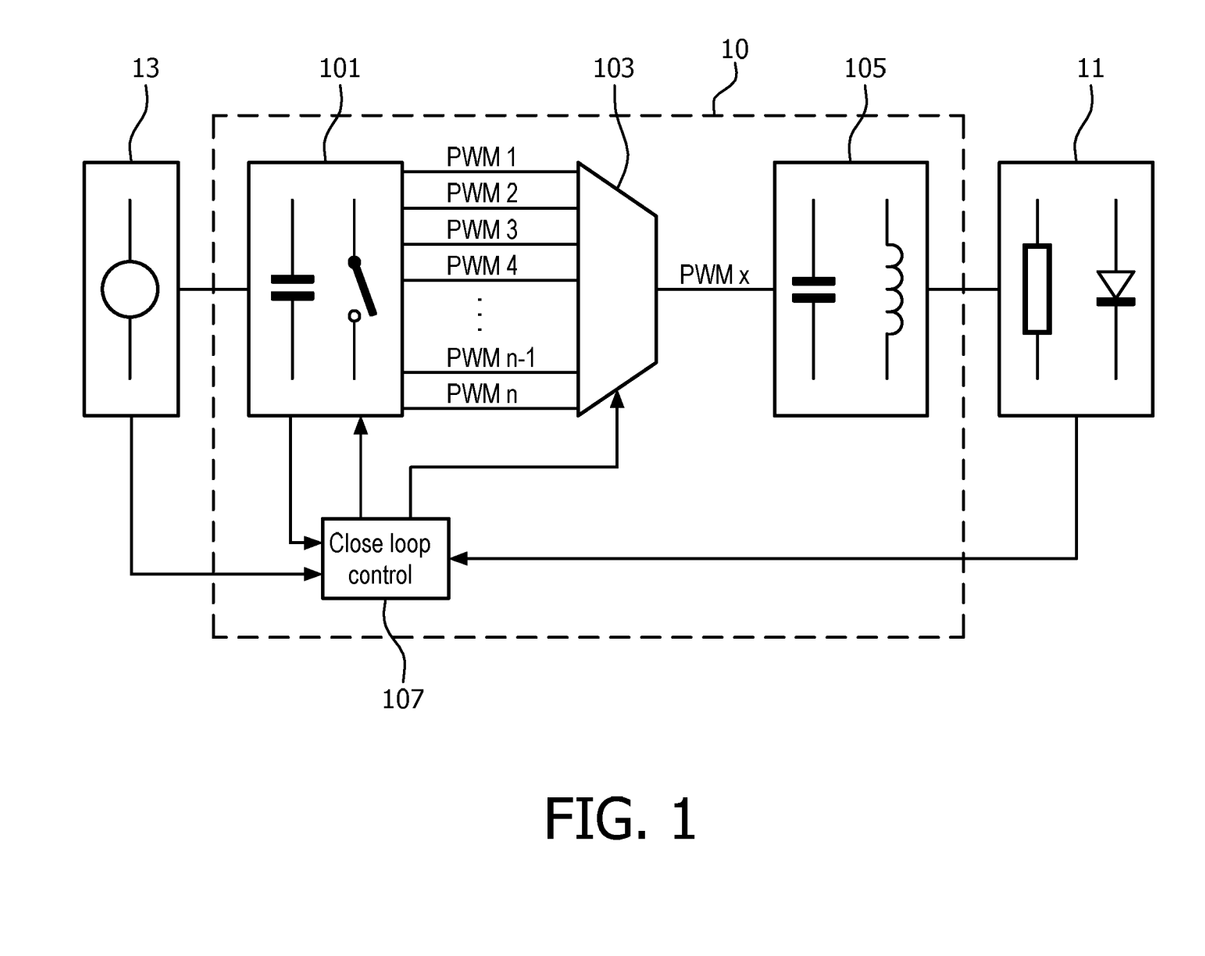
FIG. 1, a block diagram illustrating a power conversion device connected to a voltage source and a load, in an exemplary embodiment of the invention.

FIG. 1 shows a block diagram illustrating a power conversion device connected to a voltage source and a load, in an exemplary embodiment of the invention.

FIG. 1 depicts a power conversion device 10 having at least one output delivering an output signal such as a regulated DC voltage to a load 11. The power conversion device 10 has at least one input connected to a power supply 13, for example supplying a DC voltage hereinafter designated as Vin. The load 11 can for example be a resistive load, or a light emitting device such as an LED or an Organic Light Emitting Diode (OLED).

According to the current invention, the power conversion device 10 comprises a power conversion module 101 having a plurality of outputs PWM1, PWM2, . . . PWMn delivering PWM voltages. According to the current invention, one of the plurality of outputs PWM1, PWM2, . . . PWMn can be selected by means of adequate selection means, such as a selection module, and connected to an output, for example through an output filter 105. For example, the plurality of outputs PWM1, PWM2, . . . PWMn can be connected to a plurality of respective inputs of a multiplexer module 103 forming the selection module, which delivers at its output one PWM voltage PWMx from said plurality of inputs as detailed further below. The multiplexer 103 can thus be a n:1 multiplexer. It shall be understood that the power conversion device does not necessarily comprise a multiplexer as in the illustrated exemplary embodiments described hereafter. The selection module can for example be formed by an adequate wiring of one of the outputs PWM1, PWM2, . . . PWMn to the output, through the output filter 105.

The output of the multiplexer 103 is connected to the output filter 105. The output filter 105 can notably comprise at a minimum either one capacitor or one inductor.

The power conversion device 10 further comprises a controller 107 that allows a control loop by controlling the power conversion module 101 and the multiplexer module 103 as a function of input signals representative of a sensed voltage supplied by the power supply 13, DC output voltage of the power conversion module 101, hereinafter designated as vdc, and/or a signal representative of a sensed load voltage, load current or load power, for example a load voltage, hereinafter designated as vo.

One first output of the controller 107 allows controlling the power conversion module 101 and one second output of the controller 107 allows controlling the multiplexer channel, for example by means of a zonal control. An exemplary implementation of zonal control is described further in detail below in reference to FIG. 7.

The power conversion module 101 can be formed by a SCC. Thus, the controller 107 controls the power conversion module 101 through its first output, by controlling the duty cycle and/or the frequency of the power conversion module 101 by means of an analog control. An exemplary implementation of analog control is described further in detail below in reference to FIG. 6.

Figure 2:
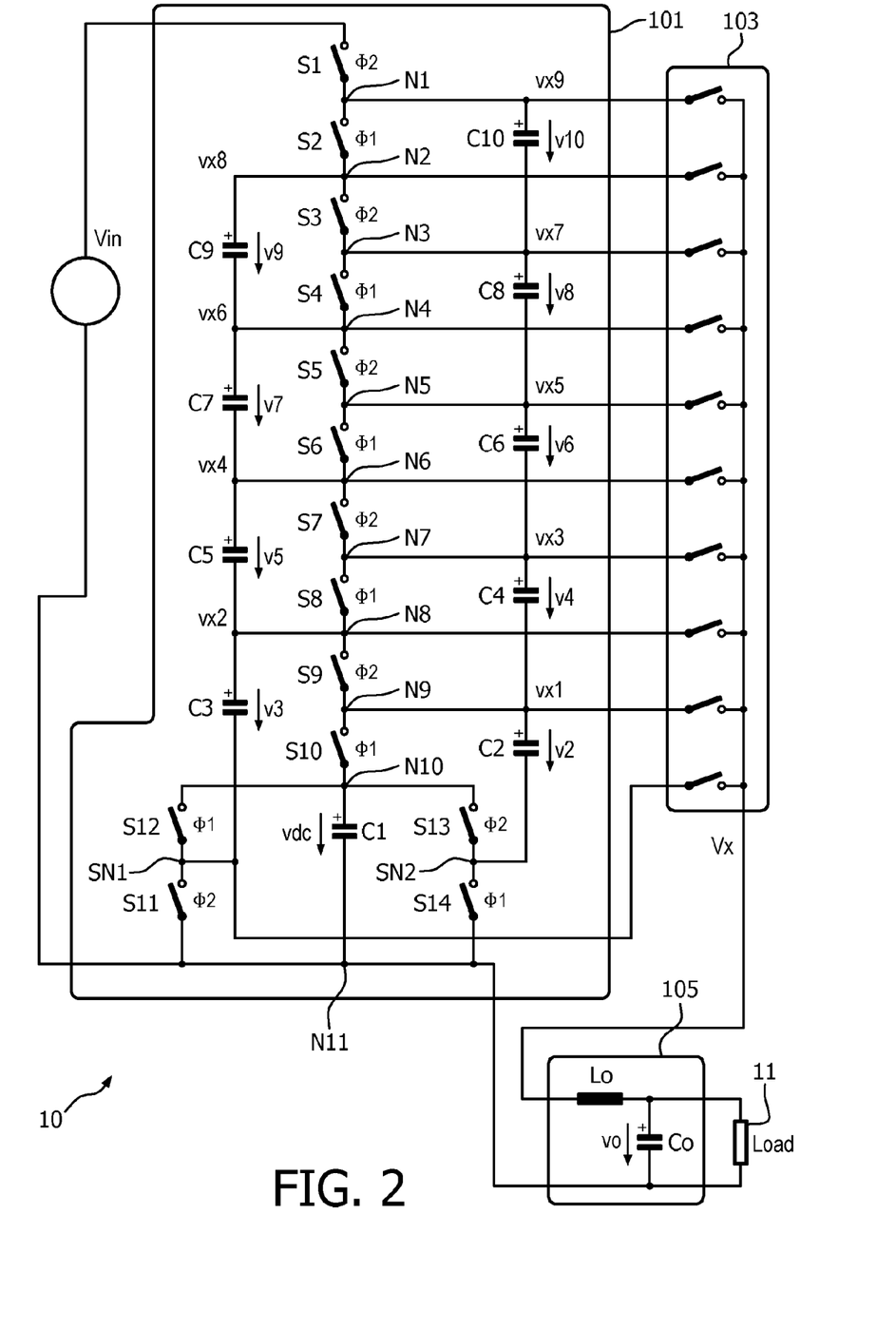
FIG. 2, an electrical diagram illustrating a power train of a power conversion device, in an exemplary embodiment of the invention.

FIG. 2 shows an electrical diagram illustrating a power conversion device 10, in an exemplary embodiment of the invention.

As described above in reference to FIG. 1, the power conversion device 10 notably comprises a power conversion module 101, a multiplexer 103 and an output filter 105.

According to the current invention, the power conversion module 101 is adapted to provide a plurality of PWM output signals as mentioned above, having a level amplitude that is a fraction of the input DC voltage Vin. In this exemplary embodiment the PWM output signals are square-waveform voltages with an amplitude that is a fraction of the input DC voltage Vin. Each of the square-wave voltages is floating with a bias component equally split, in the non-limiting illustrated exemplary embodiment, in a plurality of steps ranging from the lowest fraction amplitude to the highest fraction amplitude. Any of the voltages can be selected by means of the multiplexer 103 and can be output through an output of the multiplexer 103, the output of the multiplexer 103 being connected to the output filter 105, thus providing a continuous voltage to the load 11.

In the non-limiting exemplary embodiment illustrated by FIG. 2, the power conversion module 101 is formed by a SCC comprising a plurality of switches and capacitors. For example, the power conversion module 101 comprises a so-called Dickson Ladder converter. It shall be observed that other SCC topologies can be used, such as standard ladder, Fibonacci, or series-parallel topologies for instance.

The illustrated exemplary embodiment more specifically uses a Dickson Ladder topology based on ten capacitors C1 to C10 and fourteen switches S1 to S14 of the single pole, single throw type. More specifically, the power conversion module 101 comprises two flying ladders: one first flying ladder comprises four capacitors C3, C5, C7, C9 put in series, and one second flying ladder comprises five capacitors C2, C4, C6, C8, C10 put in series.

The power conversion module 101 further comprises ten central nodes N1 to N10. One first switch S1 selectively connects the first central node N1 to the supply voltage Vin. One second switch S2 selectively connects the first central node N1 to the second central node N2. One third switch S3 selectively connects the second central node N2 to the third central node N3. One fourth switch S4 selectively connects the third central node N3 to the fourth central node N4. One fifth switch S5 selectively connects the fourth central node N4 to the fifth central node N5. One sixth switch S6 selectively connects the fifth central node N5 to the sixth central node N6. One seventh switch S7 selectively connects the sixth central node N6 to the seventh central node N7. One eighth switch S8 selectively connects the seventh central node N7 to the eighth central node N8. One ninth switch S9 selectively connects the eighth central node N8 to the ninth central node N9. One tenth switch S10 selectively connects the ninth central node N9 to the tenth central node N10. One first capacitor C1 is placed between the tenth central node N10 and one eleventh central node N11 that is connected to a reference voltage, for example to the ground.

The first flying ladder comprising the four capacitors C3, C5, C7, C9 is located between the second central node N2 and one first secondary node SN1. One eleventh switch S11 selectively connects the first secondary node SN1 to the eleventh central node N11; one twelfth switch S12 selectively connects the first secondary node SN1 to the tenth central node N10.

The second flying ladder comprising the five capacitors C2, C4, C6, C8, C10 is located between the first central node N1 and one second secondary node SN2. One thirteenth switch S13 selectively connects the second secondary node SN2 to the tenth central node N10; one fourteenth switch S14 selectively connects the second secondary node SN2 to the eleventh central node N11.

The two flying ladders are oppositely phased, thanks to an adequate sequence of opening and closing the switches S1 to S14. For example, all the even-numbered switches S2, S4, . . . , S14 can be in a given state during a first time phase φ1, for instance turned on, while all the odd-numbered switches S1, S3, . . . , S13 can be in the opposite, for instance turned off; during a successive second time phase φ2, the states of all the switches can be reversed.

The power conversion module 101 as per the illustrated embodiment is thus configured so as to provide a conversion ratio of 10:1. The signals delivered from the central nodes N1 to N9 form as many outputs of the power conversion module 101, and are the internal nodes of the switched capacitor converter forming the power conversion module 101 in the illustrated embodiment, designated as voltages vx1 to vx9 in FIG. 2, are connected to as many inputs of the multiplexer 103. In this exemplary embodiment, the multiplexer 103 thus comprises nine switches, allowing selectively connecting one of the nine inputs to an output vx, and comprises an additional switch connected to the first secondary node SN1 for a further improved definition or dynamics of the voltage level applied to the output filter 105. More generally, the multiplexer 103 can be connected to any of the internal nodes of the power conversion module 101, and comprises as many switches as internal nodes to which it is connected. The structure of the multiplexer 103 can be simplified through reducing the number of switches, depending on the requirements with regards to the load operation.

As described above, the multiplexer 103 is a possible implementation of a selection module. An even simpler architecture of a power conversion module 101 can be realized by providing an adequate wiring of a chosen output among the plurality of outputs PWM1, PWM2, . . . PWMn of the power conversion module, which may satisfy the operating requirements of the load for some applications. In such a case, the selection module is formed by said adequate wiring. Such an embodiment notably brings the advantage of still providing a cost-efficient and compact architecture that can be adapted to a given load for example through a simple additional step of wiring in a manufacturing process.

Still in the exemplary embodiment illustrated by FIG. 2, the DC output voltage of the power conversion module 101 referred to above as vdc is the voltage across the first capacitor C1, i.e. the voltage between the tenth central node N10 and the eleventh central node N11.

As in the exemplary embodiment illustrated by FIG. 2, the switched capacitor converter can be implemented with a 10 capacitor Dickson Ladder topology with a fixed conversion ratio of 10:1 accessible from the output voltage vdc of the power conversion module 101.

Figure 3:
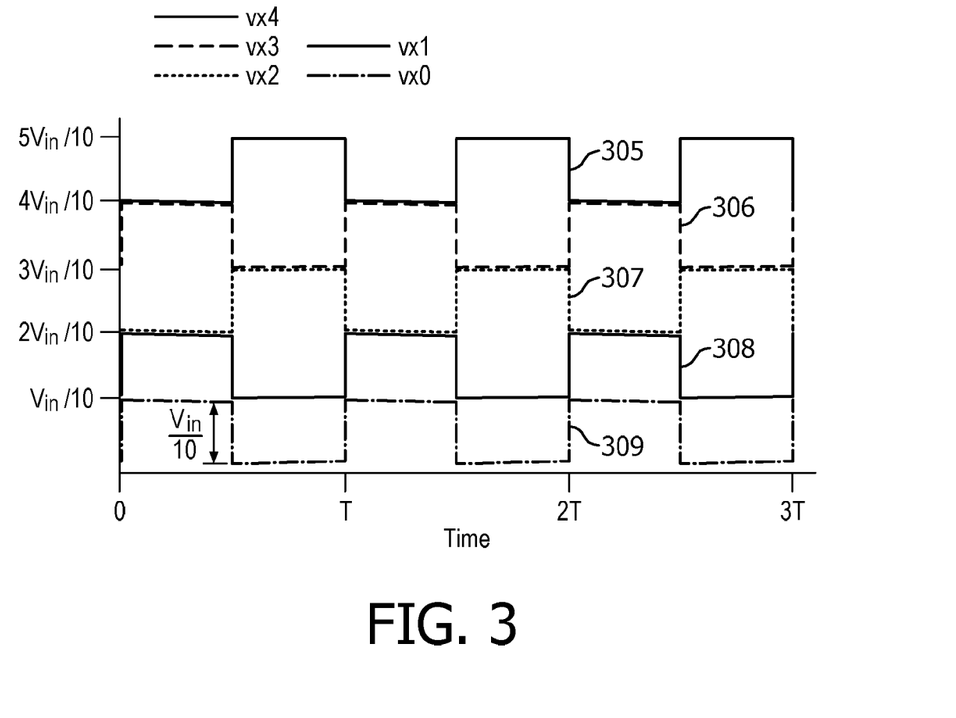
FIG. 3, time diagrams illustrating the voltages at different internal nodes of a power conversion device according to an exemplary embodiment of the invention.

Simultaneously, the voltages vx1 to vx9 at the internal nodes of the switched capacitor converter forming the power conversion module 101, are square-waveform voltages with an amplitude of a twentieth of the input DC voltage Vin. Each of the central nodes N1 to N9 produce the square-wave voltage floating with a bias component equally split in 10 steps ranging from $$\frac{Vin}{20} \text{ to } Vin \cdot \frac{19}{20},$$

as illustrated in FIG. 3, described further in details below. Any of the central nodes N1 to N9 can be connected to the output filter through the multiplexer 103.

In the exemplary embodiment of the invention illustrated by FIG. 2, using a SCC as the power conversion module 101 allows providing the output voltages of the power conversion module 101 through the already existing internal nodes of the SCC. This specific embodiment offers the advantage of allowing to lower significantly the number of capacitors used in the power conversion device, in comparison with existing power conversion devices having similar performances, as the output voltages are already available at nodes that are intrinsically comprised in the SCC forming the power conversion module 101.

As in the exemplary embodiment illustrated by FIG. 2, the output filter 105 can comprise a filter inductance Lo and a filter capacitor Co, the filter inductance Lo being connected between the output of the multiplexer 103 and the load 11 in parallel with the filter capacitor Co.

Therefore a further advantage of the current invention is that the ripple of the voltage vx signal at the output of the multiplexer 103 is dramatically lowered, which allows alleviating the requirements for the filter inductance Lo, in terms of bulk, in such a way that the inductance Lo can be easily integrated in a small package, with a size that is similar to the size of the load 11 itself, for example formed by a LED module. Typically, an inductance value is directly proportional to the voltage ripple, therefore if the voltage ripple is reduced by a factor N, then the size of the inductor can be reduced by the same factor N.

Such small ripples also provide the advantage of allowing reducing the electromagnetic emissions, therefore improving ElectroMagnetic Interference (EMI). They also provide the further advantage that voltage and current stresses in the switches comprised in the power conversion device can be dramatically reduced, therefore notably improving life-time of the power conversion device.

In order to achieve load regulation, the controller 107, as described above in reference to FIG. 1, is configured to control the appropriate channel of the multiplexer 103 and to control the power conversion module 101. The multiplexer 103 provides a coarse control with discrete voltage levels applied to the output filter 105.

The controller 107 further provides fine control PWM of the square-waves of the outputs of the power conversion module 101, i.e. the internal nodes of a SCC in the exemplary embodiment described above in reference to FIG. 2, by controlling the duty cycle of the SCC phases. Furthermore, the controller 107 can allow adjusting the switching frequency of the SCC so as to maximize the efficiency at different load levels.

Figure 4:
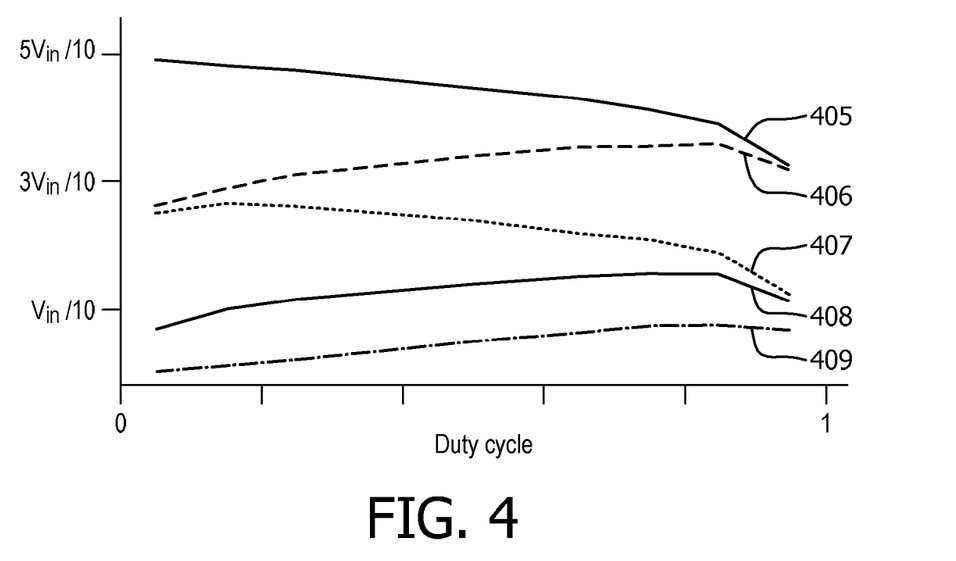
FIG. 4, curves illustrating the average voltages at different internal nodes of a power conversion device according to an exemplary embodiment of the invention, when the duty cycle of a control PWM signal is swept.

The variations of the average voltage level of some of the internal nodes of a SCC as depicted in FIG. 2 versus a sweep of the duty cycle are illustrated in FIG. 4, described in further details below.

FIG. 3 shows time diagrams illustrating the voltages at some different internal nodes of a power conversion device according to the exemplary embodiment of the invention described above in reference to FIG. 2.

In the graph depicted in FIG. 3, the abscissae correspond to elapsed time from an arbitrary instant in terms of a number of periods T of a periodic signal, while the ordinates correspond to a signal voltage, in terms of different ratios of the input supply voltage Vin. It is to be observed that for clarity's sake, not all voltages at all internal nodes of the power conversion module are represented in the graph of FIG. 3.

One first curve 305 corresponds to the voltage vx5 at the fifth central node N5 of the power conversion module; one second curve 306 corresponds to the voltage vx6 at the sixth central node N6 of the power conversion module; one third curve 307 corresponds to the voltage vx7 at the seventh central node N7 of the power conversion module; one fourth curve 308 corresponds to the voltage vx8 at the eighth central node N8 of the power conversion module; one fifth curve 309 corresponds to the voltage vx9 at the ninth central node N9 of the power conversion module.

The voltage signal represented by each of the curves 305, . . . , 309 is a square-wave signal having a period T and an amplitude that is equal to one twentieth of the input supply voltage Vin. Two curves corresponding to two consecutive nodes are separated by a step of one twentieth of the input supply voltage Vin.

FIG. 4 shows curves illustrating the average voltages at different internal nodes of a power conversion device according to an exemplary embodiment of the invention as described above in reference to FIG. 2, when the duty cycle of a PWM signal controlling the switches of the SCC is swept from 0 to 1.

As can be seen in FIG. 4, the average voltages of some nodes may overlap for extreme values of the duty cycle.

In FIG. 4, a first curve 405 shows the variations of the average voltage vx5 at the fifth internal node N5 of the power conversion module; a second curve 406 shows the variations of the average voltage vx6 at the sixth internal node N6 of the power conversion module; a third curve 407 shows the variations of the average voltage vx7 at the seventh internal node N7 of the power conversion module; a fourth curve 408 shows the variations of the average voltage vx8 at the eighth internal node N8 of the power conversion module; a fifth curve 409 shows the variations of the average voltage at the first secondary node SN1 of the power conversion module.

As shown in FIG. 4, varying the duty cycle of the signal controlling the switches of the power conversion modules, by means of the controller 107 as described above in reference to FIG. 1, allows achieving a continuous range of output voltage values; furthermore, selecting an appropriate output voltage by means of multiplexer 103 allows achieving a wide range of output voltage values.

Figure 5:
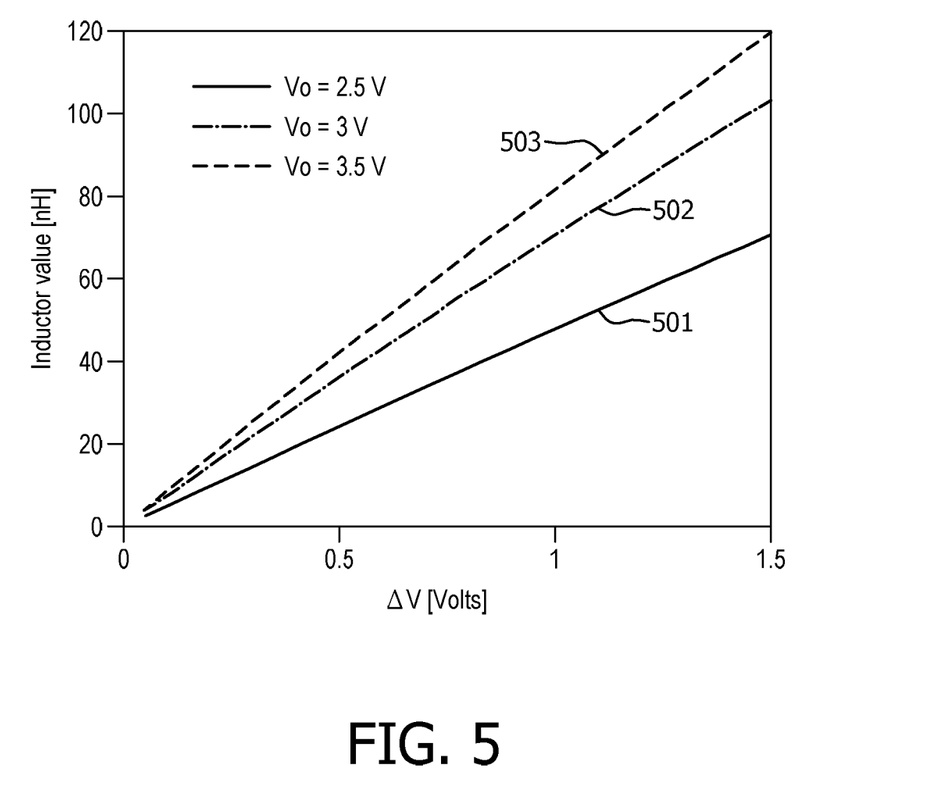
FIG. 5, curves illustrating the dependency of the inductance value of the output filter, upon variations of the output voltage ripple, for different values of nominal load voltage.

FIG. 5 shows curves illustrating the dependency of the inductance value of the output filter to variations of the output voltage ripple, for different values of the nominal load voltage vo.

As illustrated by FIG. 5, the inductance value of the output filter varies linearly as a function of the output voltage ripple. As the inductance value is representative of the actual bulk of the inductor, FIG. 5 emphasizes an advantage of the current invention in terms of size reduction of the output filter.

Figure 6:
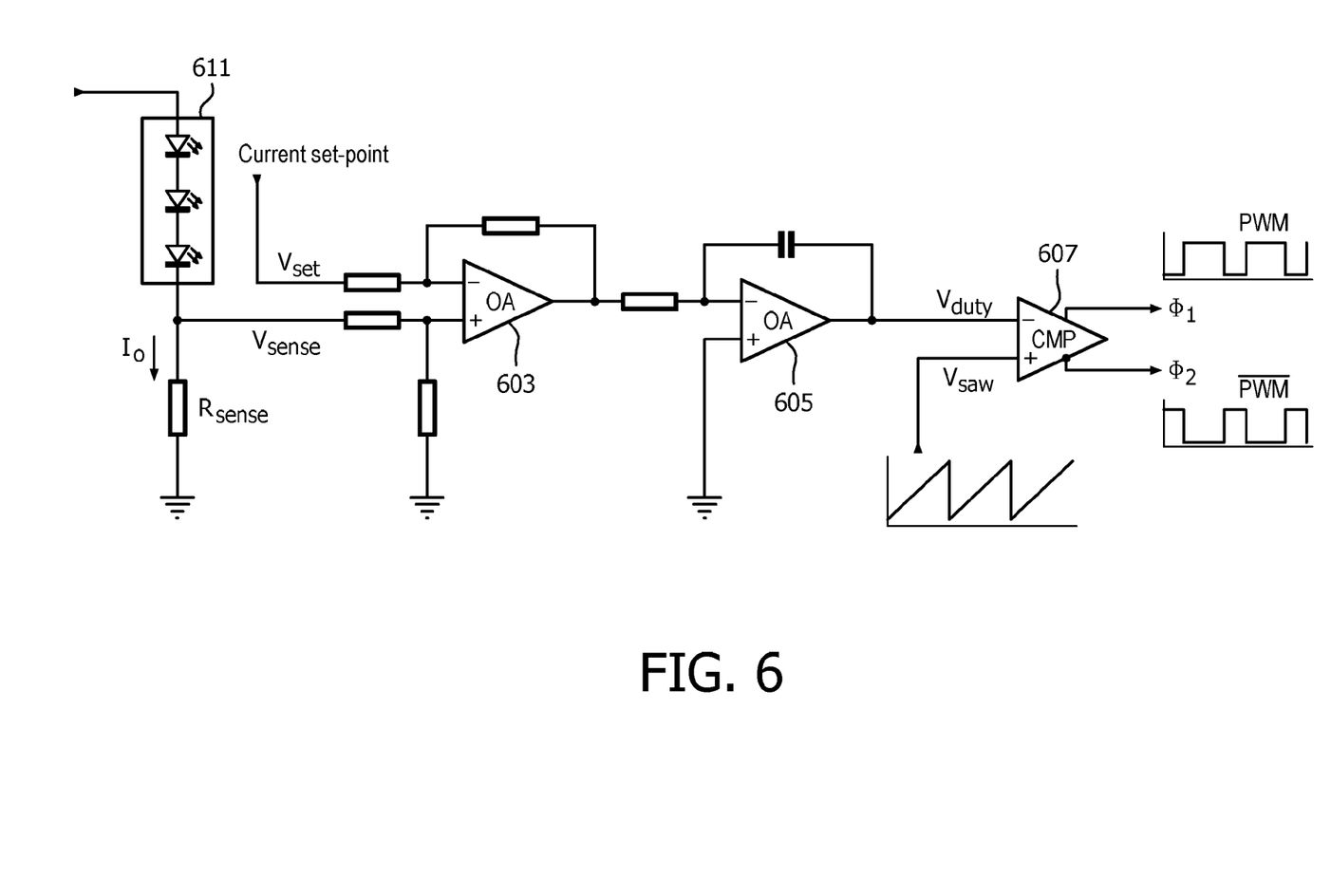
FIG. 6, a diagram illustrating an exemplary implementation of analog control, for controlling the duty cycle and/or the frequency of a power conversion module, in an exemplary embodiment of the invention.

FIG. 6 shows a diagram illustrating an exemplary implementation of analog control, for controlling the duty cycle and/or the frequency of a power conversion module, in an exemplary embodiment of the invention.

As illustrated in FIG. 6, the current flowing through a load 611, for example a LED string, can be sensed by measuring a sense voltage Vsense across a sense resistor Rsense. The sense voltage Vsense can be subtracted from a Current Set Point voltage Vset.

A Proportional-Integral (PI) controller can be formed by an amplifier circuit 603 and an integrator circuit 605, for example based on Operational Amplifiers (OA). The PI controller allows minimizing the error between the two measured voltages Vsense and Vset; the response of the PI controller can be adjusted through modifying the characteristics of the passive components, i.e. the resistors and capacitors in the illustrated exemplary embodiment, connected to the OAs.

The output voltage Vduty of the PI controller has a magnitude corresponding to the duty cycle operation of the power converter. The signals for driving the power converter, for example a switch capacitor converter as in the exemplary embodiment described above in reference to FIG. 2, can be obtained by comparing the output voltage Vduty of the PI controller with a saw-tooth wave voltage Vsaw, by means of a comparator circuit 607, thus outputting two complementary PWM signals having respectively the first time phase $\phi 1$ and the second time phase $\phi 2$. The frequency of the saw-tooth signal determines the frequency of the PWM signals and its amplitude determines the proportional gain of the PI controller. A dead time can be added between the phase driving signals to prevent shoot through of the switches.

Figure 7:
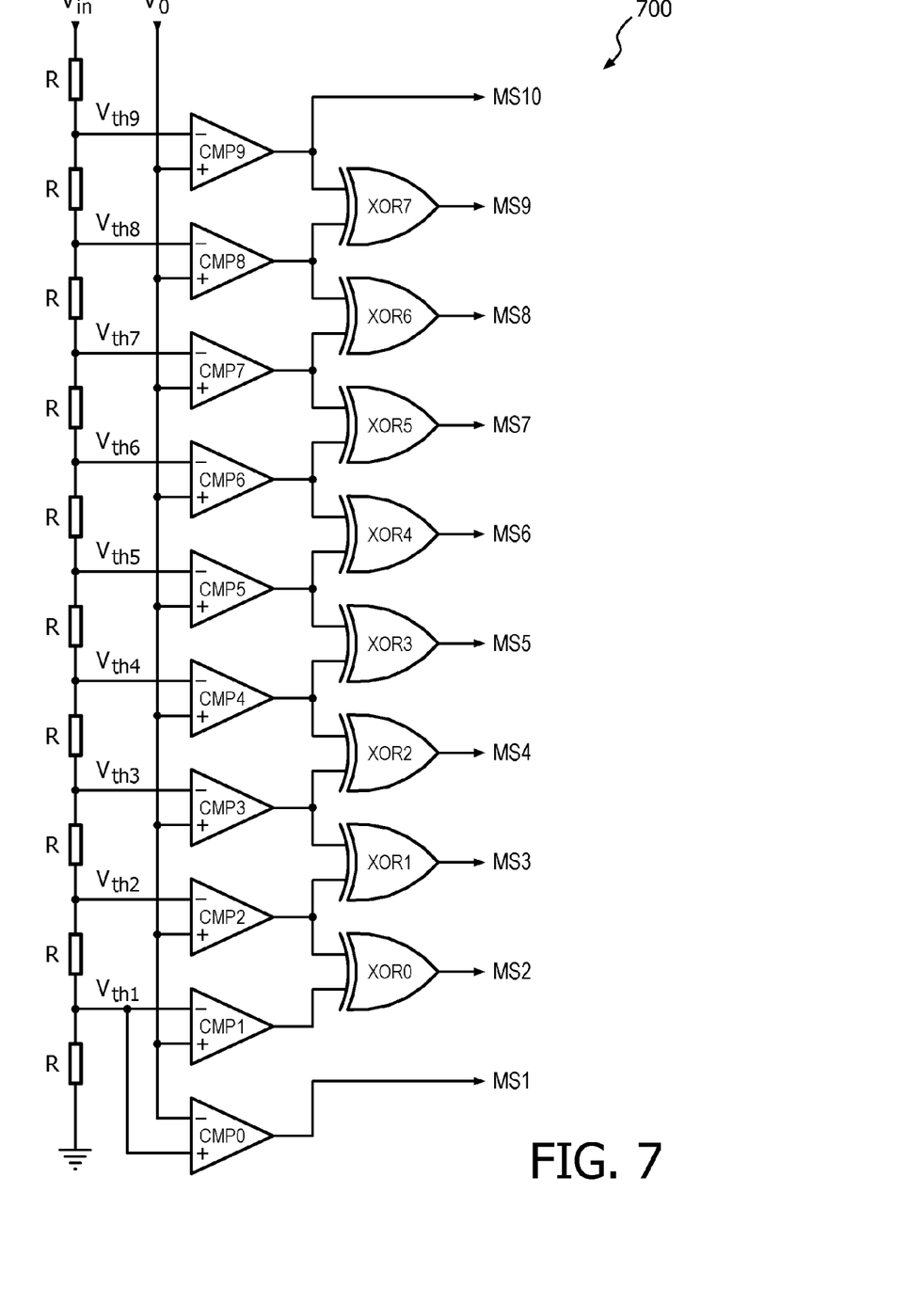
FIG. 7, a diagram illustrating an exemplary implementation of zonal control, for controlling a multiplexer channel, in an exemplary embodiment of the invention.

FIG. 7 shows a diagram illustrating an exemplary implementation of zonal control, for controlling a multiplexer channel, in an exemplary embodiment of the invention.

An additional voltage control loop can be provided so as to enable a large input/output dynamic voltage range of the power converter. The floating PWM nodes can cover the entire range of the output voltage, from 0 to Vin with slots corresponding to 1/10 of the input voltage Vin. As described above in reference to FIGS. 1 and 2, an adequate internal PWM node is connected to the output filter by selecting one of the multiplexer 103 channels. A zonal controller 700 as illustrated in FIG. 7 allows activating the right multiplexer channel by sensing the input and the output voltages.

In the exemplary embodiment illustrated by FIG. 7, the input voltage Vin can be sensed using 10 identical resistors R connected in series, which allow generating 9 DC threshold voltages Vth1, Vth2, . . . , Vth9 equally split ranging from 1/10 Vin to 9/10 Vin. The individual voltages Vth1, Vth2, . . . , Vth9 are compared with the output voltage vo using analog comparators CMP0, . . . , CMP9.

The activation signals for the two boundary channels/levels of the multiplexer, i.e. a top level activation signal MS10 and a bottom level activation signal MS1, can be directly derived from the corresponding comparators CMP9, CMP0. The other activation signals are generated by connecting the outputs of contiguous comparators with an exclusive- or gate XORx. Hence the corresponding channel is active when the output voltage lies between two threshold levels voltages; i.e. in case Vin 3/10<vo<Vin 4/10, the outputs of the first three comparators CMP1, CMP2, CMP3 are set at a HIGH level and the outputs of the other comparators CMP0, CMP4, . . . , CMP9 are set at a LOW level. In this exemplary configuration, since only the gate XOR1 has its inputs at different levels, then the activation signal MS4 is the only active (HIGH level) signal while the other activation signals are inactive (LOW level).

All the elements comprised in the embodiments described above can be sized small enough to enable integration, for example as a Power System on a Chip (PSoC) or Power System in a Package (PSiP). In the illustrated exemplary embodiment, the capacitance for all capacitors can be set to 100 nF; the capacitance values can be further optimized in order to achieve a better performance. The inductance value of the filter inductor Lo can be set to 200 nH, making it possible to be printed in an LED sub-mount with a surface of 5×5 mm. For example, a LED package can be designed so as to comprise at least one LED and a driver comprising a power conversion device as described in the different embodiments.

The capacitors can also be implemented using a technology similar to that applied to Ferroelectric Random Access Memory (FRAM) or embedded Dynamic Random Access Memory (eDRAM). The higher dielectric constant achieved with such technologies makes the integrated SCCs smaller and thus cheaper.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For example, the embodiments that are described above relate to power conversion modules being formed by a SCC of a specific topology, while any other type of power converter may be used.

It is to be noticed that though mostly applications wherein the load is a light source are described herein, the current invention can also apply to many systems wherein there is a need for integrated power management units, for example in integrated devices such as implantable or wearable body sensors for sensing physical or physiological parameters, or in integrated energy harvesting units, etc.

All definitions, as defined and used herein, should be understood to overrule dictionary definitions, definitions in documents incorporated by reference, and/or ordinary meanings of the defined terms.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed at limiting the scope.

The invention claimed is:

1. A power conversion device for supplying a load with an output signal, the power conversion device comprising:
   an inductive output filter having an output configured to be connected to the load;
   a power conversion module supplied by a DC input voltage and configured to provide a plurality of pulse width modulated (PWM) signals each having a level amplitude that is a fraction of the DC input voltage, wherein the fraction is less than one, each PWM signal being floating with a bias component, the bias components of the PWM signals being split in a plurality of steps ranging from a determined lowest fraction of the DC input voltage to a determined highest fraction of the DC input voltage; and
   a selection module receiving the plurality of PWM signals and being configured to select one PWM signal among said plurality of PWM signals, the selected one PWM signal being connected to an input of the inductive output filter.

2. The power conversion device of claim 1, wherein said selection module comprises a multiplexer receiving at a plurality of inputs said plurality of PWM signals and being configured for outputting the selected one PWM output signal in response to one or more activation signals.

3. The power conversion device of claim 2, further comprising a zonal controller configured to generate the activation signals, the zonal controller comprising:
   a resistor ladder comprising a plurality of resistors connected in series between the DC input voltage and ground, wherein a plurality of nodes exist between each pair of adjacent ones of the resistors in the resistor ladder;

a plurality comparators each having one input connected to a correspond one of the nodes and having another input connected to a comparison threshold voltage, including a first comparator having the one input thereof connected to a first one of the nodes at a first end of the ladder and a second comparator having the one input thereof connected to a last one of the nodes at a second end of the ladder, each of the comparators having an output configured to generate a comparison output signal;

a plurality of exclusive-OR (XOR) gates each having an output configured to generate an XOR output signal, and having a pair of inputs which are connected to the outputs of a pair of the comparators whose inputs are connected to adjacent ones of the nodes, wherein the activation signals comprise the comparison output signals of the first and second comparators and the XOR output signals of the plurality of XOR gates.

4. The power conversion device of claim 1, wherein said selection module comprises a wiring of the selected PWM signal to the inductive output filter.

5. The power conversion device of claim 1, further comprising a controller configured for controlling a duty cycle and a frequency of the PWM signals of the power conversion module as a function of at least one component among the group consisting of input signals representative of a sensed DC input voltage, a sensed output voltage of the power conversion module, and a signal representative of a sensed load voltage, load current or load power.

6. The power conversion device of claim 5, wherein the power conversion module comprises a Switched Capacitor Converter (SCC), comprising a plurality of switches controlled by the controller.

7. The power conversion device of claim 6, wherein the power conversion module is based on a Dickson ladder topology.

8. The power conversion device of claim 7, wherein said plurality of PWM signals are formed by voltages at respective internal nodes of the power conversion module.

9. A driver for a light emitting diode (LED) comprising the power conversion device as claimed in claim 1.

10. An LED package comprising at least one LED and the driver as claimed in claim 9.

11. The LED package of claim 10, integrated as a Power System on a Chip (PSoC) or Power System in a Package (PSiP).

12. The power conversion device of claim 1, wherein the power conversion module comprises:

a first flying ladder which includes a first plurality of capacitors in series with each other, and a second flying ladder, which includes a second plurality of capacitors, separate from the first plurality of capacitors, in series with each other, wherein the first and second flying ladders are oppositely phased with respect to each other.

13. A method for supplying a load with a Pulse Width Modulation (PWM) signal through an inductive output filter having at least an output configured to be connected to the load, the method comprising:

converting power supplied by a DC input voltage into a plurality of output signals each having a level amplitude that is a fraction of the DC input voltage, wherein the fraction is less than one, each output signal being floating with a bias component split in a plurality of steps ranging from a determined lowest fraction of the DC input voltage to a determined highest fraction of the DC input voltage, and selecting one output signal from said plurality of output signals to supply the load through the output filter as the Pulse Width Modulation (PWM) signal.

14. The method of claim 13, wherein converting the power comprises operating first and second flying ladders of a power conversion module to be oppositely phased with respect to each other, wherein the first flying ladder includes a first plurality of capacitors in series with each other, and the second flying ladder includes a second plurality of capacitors, separate from the first plurality of capacitors, in series with each other.

15. The method of claim 13, further comprising controlling a duty cycle and a frequency of the output signals as a function of at least one component among the group consisting of input signals representative of a sensed DC supply voltage, a sensed output voltage of a power conversion module, and a signal representative of a sensed load voltage, load current or load power.

* * * * *